US008090559B2

(12) United States Patent
Parthasarathy et al.

(10) Patent No.: US 8,090,559 B2
(45) Date of Patent: Jan. 3, 2012

(54) METHODS AND SYSTEMS FOR PERFORMING DIAGNOSTICS REGARDING UNDERLYING ROOT CAUSES IN TURBINE ENGINES

(75) Inventors: Girija Parthasarathy, Maple Grove, MN (US); Dinkar Mylaraswamy, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 672 days.

(21) Appl. No.: 11/950,927

(22) Filed: Dec. 5, 2007

(65) Prior Publication Data

US 2009/0150131 A1    Jun. 11, 2009

(51) Int. Cl.
*G06G 7/48* (2006.01)
(52) U.S. Cl. ............................................... 703/7; 703/6
(58) Field of Classification Search .................. 703/6, 7; 714/47
See application file for complete search history.

(56) References Cited

U.S. PATENT DOCUMENTS

| | | | |
|---|---|---|---|
| 6,625,569 B2 * | 9/2003 | James et al. .................. 702/183 |
| 6,823,675 B2 * | 11/2004 | Brunell et al. .................. 60/773 |
| 7,020,595 B1 * | 3/2006 | Adibhatla et al. ................. 703/7 |
| 7,080,290 B2 * | 7/2006 | James et al. ..................... 714/47 |
| 2003/0014692 A1 * | 1/2003 | James et al. ..................... 714/25 |
| 2003/0083827 A1 | 5/2003 | Chow et al. |
| 2004/0176879 A1 * | 9/2004 | Menon et al. ...................... 701/1 |
| 2008/0228338 A1 * | 9/2008 | Howard et al. ................. 701/29 |

FOREIGN PATENT DOCUMENTS

EP      1752898 A2     2/2007

OTHER PUBLICATIONS

EP Search Report dated Feb. 17, 2009, 08170329.0.
Weidl, G., Madsen, A.L., Israelson, S.; "Applications of object-oriented Bayesian networks for condition monitoring, root cause analysis and decision support on operation of complex continuous process," Computers & Chemical Engineering; vol. 29, No. 9, Aug. 15, 2005, XP025272473.
EP Search Report dated Apr. 29, 2009, EP 08170329.0.
Kurz, R., et al., Degradation in Gas Turbine Systems, ASME 2000-GT-345, 2000.
Aker, G.,et al., Predicting Gas Turbine Performance Degradation Due to Compressor Fouling Using Computer Simulation Techniques, Journal of Engineering for Gas Turbines and Power, 1989, vol. 111.
Bolcs, A.,et al., Influence of Deposit on the Flow in a Turbine Cascade, Transactions of the ASME, vol. 110, 1988.
Diakunchak, I.S., Performance Deterioration in Industrial Gas Turbines, Journal of Engineering for Gas Turbine and Power, vol. 114, Apr. 1992 pp. 161-168.

(Continued)

*Primary Examiner* — Dwin M Craig
*Assistant Examiner* — Aniss Chad
(74) *Attorney, Agent, or Firm* — Ingrassia Fisher & Lorenz, P.C.

(57) ABSTRACT

A method for performing diagnostics for an engine comprises the steps of identifying an engine component as potentially being related to operational data of an engine, calculating a deviation from a thermodynamic model, and comparing the deviation with root cause deviation measures. The deviation relates the engine component to an adjustment to the thermodynamic model with respect to a variable of the thermodynamic model, based at least in part on the operational data. Each root cause deviation measure relates one of a plurality of potential root causes to the thermodynamic model with respect to the variable of the thermodynamic model.

22 Claims, 6 Drawing Sheets

OTHER PUBLICATIONS

Kind, Richard, et al., Measurements and Prediction of the Effects of Surface Roughness on Profile Losses and Deviation in a Turbine Cascade, 96-GT-203, The American Society of Mechanical Engineers 1996.

MacLeod, J.D., et al., Implanted Component Faults and Their Effects on Gas Turbine Engine Performance, Journal of Engineering for Gas Turbine and Power, vol. 114, Apr. 1992, pp. 174-179.

* cited by examiner

FIG. 6

| 504 | 602 Efficiency Scalar (604) | Airflow Scalar (606) |
|---|---|---|
| HPT | X X X | X X X |
| HPC | X X X | X X X |
| LPT | X X X | X X X |
| LPC | X X X | X X X |
| FAN TIP | X X X | X X X |
| FAN HUB | X X X | X X X |
| COMBUSTOR | X X X | X X X |

| 504 | 702 | 602 Efficiency Scalar (704) | Airflow Scalar (706) |
|---|---|---|---|
| HPT | TIP CLEARANCE | X X X | X X X |
|  | PROFILE LOSS | X X X | X X X |
| HPC | TIP CLEARANCE | X X X | X X X |
|  | PROFILE LOSS | X X X | X X X |
| LPT | TIP CLEARANCE | X X X | X X X |
|  | PROFILE LOSS | X X X | X X X |
| LPC | TIP CLEARANCE | X X X | X X X |
|  | PROFILE LOSS | X X X | X X X |
| FAN TIP | TIP CLEARANCE | X X X | X X X |
|  | PROFILE LOSS | X X X | X X X |
| FAN HUB | TIP CLEARANCE | X X X | X X X |
|  | PROFILE LOSS | X X X | X X X |
| COMBUSTOR | TIP CLEARANCE | X X X | X X X |
|  | PROFILE LOSS | X X X | X X X |

(512)

METHODS AND SYSTEMS FOR PERFORMING DIAGNOSTICS REGARDING UNDERLYING ROOT CAUSES IN TURBINE ENGINES

FIELD OF THE INVENTION

The present invention relates to turbine engines and, more particularly, to improved methods and systems for performing engine diagnostics in turbine engines.

BACKGROUND OF THE INVENTION

Turbine engines routinely undergo diagnostic testing or monitoring throughout the life of the engine, for example through the use of a turbine engine health monitoring systems. Such turbine engine health monitoring systems typically monitor either measured quantities or derivatives of measured quantities of engine performance. Such measured quantities or derivatives are generally fairly accurate measures of deviation in engine operation. However, these measured quantities or derivatives may not indicate the underlying root cause and/or a level of severity thereof.

Accordingly, there is a need for an improved method for determining underlying root causes in a turbine engine. There is also a need for an improved system for determining underlying root causes in a turbine engine. In addition, there is a need for improved methods and systems for determining a severity of the underlying root causes in a turbine engine. Furthermore, other desirable features and characteristics of the present invention will become apparent from the subsequent detailed description of the invention and the appended claims, taken in conjunction with the accompanying drawings and this background of the invention.

SUMMARY OF THE INVENTION

In accordance with an exemplary embodiment of the present invention, a method for performing diagnostics for an engine using operational data for the engine is provided. The method comprises the steps of identifying an engine component as potentially being related to the operational data, calculating a component deviation from a thermodynamic model, and comparing the component deviation with a plurality of root cause deviation measures. The component deviation relates the engine component to an adjustment to the thermodynamic model with respect to a variable of the thermodynamic model, based at least in part on the operational data. Each root cause deviation measure relates one of a plurality of potential root causes to the thermodynamic model with respect to the variable of the thermodynamic model.

In accordance with another exemplary embodiment of the present invention, a program product is provided for performing diagnostics for an engine using operational data for the engine. The program product comprises a program and a computer-readable signal bearing media. The program is configured to at least facilitate identifying an engine component as potentially being related to the operational data, calculating a component deviation from a thermodynamic model, and comparing the component deviation with a plurality of root cause deviation measures. The component deviation relates the engine component to an adjustment to the thermodynamic model with respect to a variable of the thermodynamic model, based at least in part on the operational data. Each root cause deviation measure relates one of a plurality of potential root causes to the thermodynamic model with respect to the variable of the thermodynamic model. The computer-readable signal bearing media bears the program.

In another exemplary embodiment of the present invention, a program product is provided for generating a root cause deviation for a component of an engine for use in performing diagnostics for the engine. The program product comprises a program and a computer-readable signal bearing media. The program is configured to at least facilitate identifying a plurality of root causes of a symptom in the engine, each root cause comprising a condition of the component, simulating conditions of the component for each of the plurality of root cases, to thereby generate simulated data, developing a mapping between each potential root cause and a first variable related to engine performance, using the simulated data and an aerodynamic model, and relating the mapping to a second variable of a thermodynamic model, to thereby determine a root cause deviation measure for the component. The computer-readable signal bearing media bears the program.

In accordance with a further exemplary embodiment of the present invention, a health maintenance system for an engine is provided. The health maintenance system comprises a sensing device and a processor. The sensing device is configured to sense operational data for an engine. The processor is configured to at least facilitate determining identifying an engine component as potentially being related to the operational data, calculating a component deviation from a thermodynamic model, and comparing the component deviation with a plurality of root cause deviation measures, each root cause deviation measure relating one of a plurality of potential root causes to the thermodynamic model. The component deviation relates the engine component to an adjustment to the thermodynamic model with respect to a variable of the thermodynamic model, based at least in part on the operational data.

BRIEF DESCRIPTION OF THE DRAWINGS

FIG. 6 is a representation of a component deviation table, that can be used in connection with the alternative process of FIG. 5, including measures of adjustments to a thermodynamic model resulting from values pertaining to various engine components, in accordance with an exemplary embodiment of the present invention; and FIG. 7 is a representation of a root cause deviation table that can be used in connection with the alternative process of FIG. 5, including measures of adjustments to a thermodynamic model resulting from values pertaining to various root causes related to various engine components, in accordance with an exemplary embodiment of the resent invention.

DETAILED DESCRIPTION OF A PREFERRED EMBODIMENT

Before proceeding with the detailed description, it is to be appreciated that the described embodiment is not limited to use in conjunction with a particular type of turbine engine, or to turbine engines in general. Thus, although the present embodiment is, for convenience of explanation, depicted and described as being implemented in connection with a turbine engine, it will be appreciated that it can be implemented in connection with various other devices, systems, and/or environments.

Figure 1:
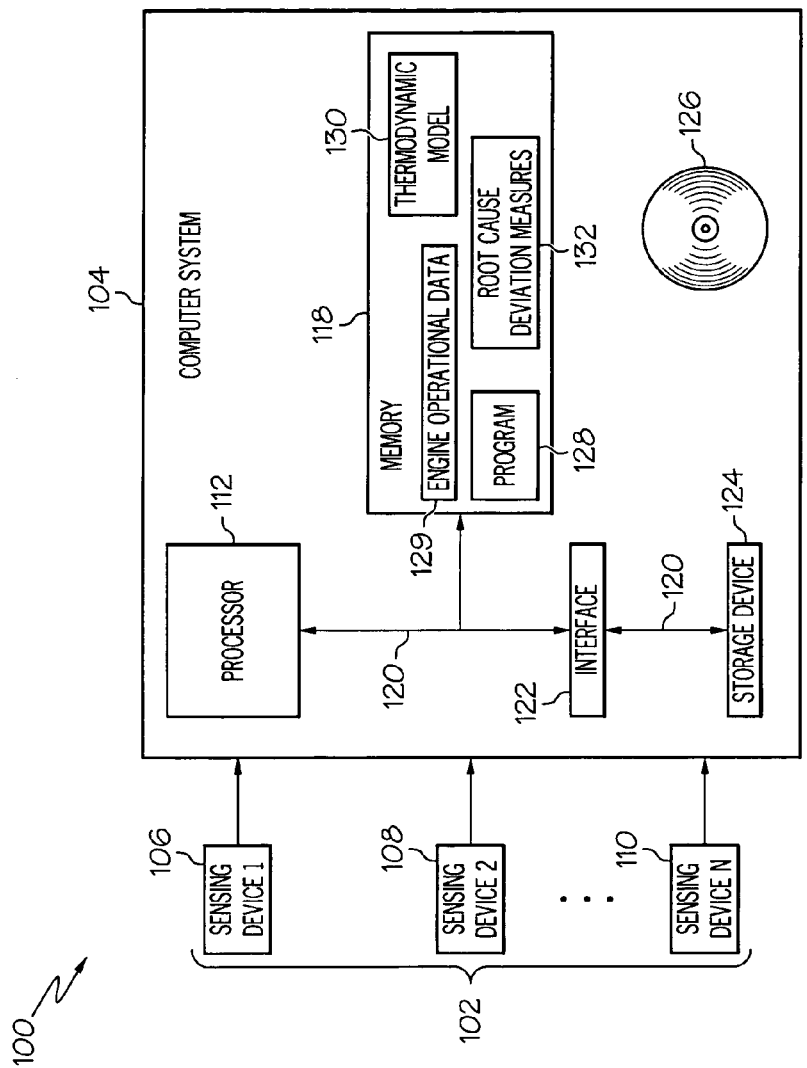
FIG. 1 is a functional block diagram for a health maintenance system for performing diagnostics on an engine, in accordance with an exemplary embodiment of the present invention.

FIG. 1 depicts a functional block diagram showing a health maintenance system 100 for determining one or more likely root causes from a symptom related to one or more components of an engine. In the depicted embodiment, the health maintenance system 100 includes a sensing device unit 102 and a computer system 104.

The sensing device unit 102 includes various sensors for gathering information or data regarding performance and operation of an engine, for subsequent use by the computer system 104 in identifying one or more symptoms of the engine and one or more likely root causes thereof. In the depicted embodiment, the sensing device unit 102 includes a first sensing device 106, a second sensing device 108, and additional sensing devices 110. In various embodiments, the sensing device unit 102 may include any number of different sensing devices. Also, in certain embodiments, the sensing device unit 102, or portions thereof, may be implemented as part of the computer system 104, one or more other computer systems, and/or any one or more of a number of other different types of systems and/or devices.

The computer system 104 is coupled to the sensing device unit 102. The computer system 104 receives data from the various sensors of the sensing device unit 102. As described in more detail below, the computer system 104 uses values from the sensing device unit 102 to perform various calculations, comparisons, and determinations, such as those described further below in connection with FIGS. 2-7, for example in determining one or more likely root causes of a symptom of an engine as represented in operational data of the engine.

In the depicted embodiment, the computer system 104 includes a processor 112, a memory 118, a bus 120, an interface 122, and a storage device 124. The processor 112 performs the computation and control functions of the computer system 104, and may comprise any type of processor or multiple processors, single integrated circuits such as a microprocessor, or any suitable number of integrated circuit devices and/or circuit boards working in cooperation to accomplish the functions of a processing unit. During operation, the processor 112 executes one or more programs 128 preferably stored within the memory 118 and, as such, controls the general operation of the computer system 104.

In one embodiment, the memory 118 stores a program or programs 128 that executes one or more embodiments of a root cause determination process of the present invention, discussed in more detail below. The memory 118 can be any type of suitable memory. In addition, in a preferred embodiment, the memory 118 stores engine operational data 129 generated from data or information measured by the sensing device unit 102, a thermodynamic model 130, and/or a plurality of root cause deviation measures 132, which may all be used in the root cause determination process of FIG. 2, and/or other processes, such as those described further below, in various embodiments. The memory 118 may include one or more of various types of dynamic random access memory (DRAM) such as SDRAM, the various types of static RAM (SRAM), and the various types of non-volatile memory (PROM, EPROM, and flash). It should be understood that the memory 118 may be a single type of memory component, or it may be composed of many different types of memory components. In addition, the memory 118 and the processor 112 may be distributed across several different computers that collectively comprise the computer system 104. For example, a portion of the memory 118 may reside on a computer within a particular apparatus or process, and another portion may reside on a remote computer.

The bus 120 serves to transmit programs, data, status and other information or signals between the various components of the computer system 104. The bus 120 can be any suitable physical or logical means of connecting computer systems and components. This includes, but is not limited to, direct hard-wired connections, fiber optics, infrared and wireless bus technologies.

The interface 122 allows communication to the computer system 104, for example from a system driver and/or another computer system, and can be implemented using any suitable method and apparatus. It can include one or more network interfaces to communicate with other systems or components, for example the sensing device unit 102 and the various sensors thereof. The interface 122 may also include one or more network interfaces to communicate with technicians, and/or one or more storage interfaces to connect to storage apparatuses, such as the storage device 124.

The storage device 124 can be any suitable type of storage apparatus, including direct access storage devices such as hard disk drives, flash systems, floppy disk drives and optical disk drives. In one exemplary embodiment, the storage device 124 is a program product from which memory 118 can receive a program 128 that executes one or more embodiments of a root cause determination process and/or other processes of the present invention. As shown in FIG. 1, the storage device 124 can comprise a disk drive device that uses disks 126 to store data. As one exemplary implementation, the computer system 104 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 126), and transmission media such as digital and analog communication links. It will similarly be appreciated that the computer system 104 may also otherwise differ from the embodiment depicted in FIG. 1, for example in that the computer system 104 may be coupled to or may otherwise utilize one or more remote computer systems and/or other control systems.

Figure 2:
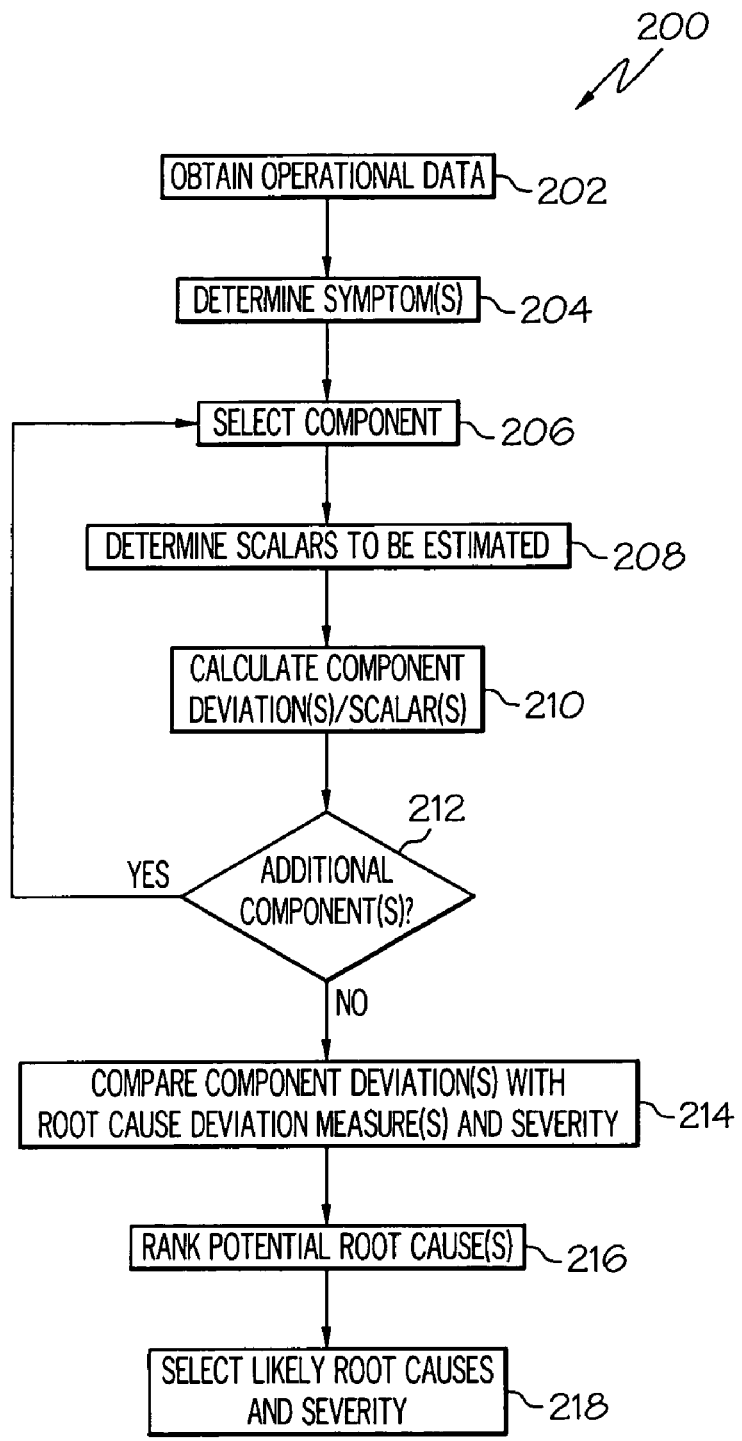
FIG. 2 is a flowchart of a process for determining a likely root cause of a symptom identified from operational data for an engine, and that can be implemented in connection with the health maintenance system of FIG. 1, in accordance with an exemplary embodiment of the present invention.

FIG. 2 is a flowchart of a root cause determination process 200 for determining a likely root cause of a symptom identified from operational data for an engine. The root cause determination process 200 can be implemented in connection with the health maintenance system 100 of FIG. 1, in accordance with an exemplary embodiment of the present invention.

As depicted in FIG. 2, the root cause determination process 200 begins with the step of obtaining operational data regarding an engine (step 202). In a preferred embodiment, the engine operational data is obtained using information or data generated by the sensing device unit 102. Also in a preferred embodiment, the engine operational data is generated at least in part by the processor 112, and is stored in the memory 118 of FIG. 1. Regardless of how it is generated, the engine operational data preferably represents a plurality of performance measures of the engine.

An engine symptom is then obtained from the operational data (step 204). In a preferred embodiment, the engine symptom represents a measure of engine performance that is unexpected and/or undesirable. Also in a preferred embodiment, the engine symptom is determined by the processor 112 of FIG. 1, based on operational data 129 stored in the memory 118 of FIG. 1.

An engine component is then selected as potentially being a top-level source of the identified engine symptom (step 206). For example, in a preferred embodiment, the engine component may include a high pressure turbine, a low pressure turbine, a high pressure compressor, a low pressure compressor, a fan, a combustor, and/or any one of a number of different types of engine components. In a preferred embodiment, a first model is also selected for correlating the engine component with the engine symptom via a thermodynamic model. In a preferred embodiment, the first model comprises a thermodynamic model, and will be hereafter referenced as the "thermodynamic model". However, in certain embodiments, other types of models may be used. In addition, multiple engine components and/or other variables may also be used, for example in different iterations of steps 206. Also in a preferred embodiment, the processor 112 of FIG. 1 identifies the engine component and the thermodynamic model variable, and uses a thermodynamic model 130 stored in the memory 118 of the computer system 104, as shown in FIG. 1. Once the engine component is selected, a determination is made as to various scalars that need to be estimated (step 208) in order to calculate a deviation measure for the component, as will be described below.

Next, a component deviation is calculated (step 210), representing a relationship between the engine component and the thermodynamic model. For example, in a preferred embodiment, the thermodynamic model may use one or more thermodynamic variables, such as efficiency change, airflow change, pressure ratio change, or any one of a number of other different variables that may be used to ascertain a deviation to a thermodynamic model caused by the engine component. Specifically, in a preferred embodiment, the component deviation represents an adjustment to a thermodynamic model that is believed to be potentially caused by the engine component identified in step 206, as reflected in the operational data obtained in step 202. Also in a preferred embodiment, the component deviation comprises one or more scalars identified in step 208, each such scalar representing a multiplicative or additive deviation to the thermodynamic model. As mentioned above, in certain embodiments a different type of model, other than a thermodynamic model, may be used.

The adjustment to the thermodynamic model is preferably manifested via one or more thermodynamic model variables. For example, if a high pressure turbine was identified as the engine component in step 206, then the component deviation may include a shift or other adjustment in the values of an airflow change variable and/or one or more other variables in the thermodynamic model believed to be caused by a state or condition of the engine component, such as the top level fault assumed in step 204, in one exemplary embodiment. In a preferred embodiment, the component deviation is calculated by the processor 112 of FIG. 1, using the engine operational data 129 and the thermodynamic model 130 stored in the memory 118 of the computer system 104.

The process then proceeds to step 212, in which a determination is made as to whether there are any additional engine components for consideration. In a preferred embodiment, this determination is made by the processor 112 of FIG. 1. If it is determined in step 212 that there are one or more additional engine components for consideration, then steps 206-212 repeat until there is a determination in a subsequent iteration of step 212 that there are no additional engine components for consideration. Thus, in a preferred embodiment, steps 206-212 are repeated to ensure that the various component deviations are for each of the engine components being considered.

Next, in step 214, the component deviation is compared with a plurality of root cause deviations as well as to severity levels reflected therein. The root cause deviation measures represent relationships between the potential root causes and the thermodynamic model. Specifically, in a preferred embodiment, each root cause deviation measure includes one or more simulated values calculated using an aerodynamic model and simulated operational data. Each root cause deviation measure preferably relates a potential root cause to the thermodynamic model with respect to one or more thermodynamic model variables, such as those used in step 210. In a preferred embodiment, each root cause deviation measure comprises a scalar or other adjustment factor that represents a multiplicative or additive deviation to the thermodynamic model. Also in a preferred embodiment, the root cause deviation measures are calculated using an aerodynamic model.

In a preferred embodiment, the root cause deviation measures may be previously calculated before the root cause determination process 200 begins. For example, as shown in FIG. 1, various root cause deviation measures 132 may already be stored in the memory 118 of the computer system 104 of FIG. 1. Such root cause deviation measures 132 may be previously calculated using simulated operational data before the engine operational data 129 is generated, in certain embodiments. comprises a scalar or other adjustment factor that represents a multiplicative or additive deviation to the thermodynamic model.

Also in a preferred embodiment, the comparison of step 214 is conducted by the processor 112 of FIG. 1. For example, the comparison may be conducted using an generalized least squares approach, any one of a number of different types of comparison algorithms, and/or any one of a number of different types of approaches. Also in a preferred embodiment, multiple root cause deviation measures are compared with multiple component deviations with respect to multiple thermodynamic variables, and/or with respect to multiple engine components, for example as steps 206-212 are repeated. Ultimately, the comparisons in step 214 are used to rank the potential root causes, to select a likely root cause based on the ranking, and to calculate a severity thereof, as will be discussed further below in connection with steps 216 and 218.

The potential root causes are then ranked (step 216) based on the comparisons conducted in step 214. Specifically, in a preferred embodiment, the potential root causes are ranked in step 216 with respect to how closely their respective root cause deviation measures are to the component deviations determined with respect to the engine components pertaining thereto. In a preferred embodiment, this ranking is conducted by the processor 112 of FIG. 1.

Next, in step 218, one or more likely root causes are selected, and severities are estimated therefore, based on the ranking from step 216. In a preferred embodiment, the severities of the likely root causes are calculated based on the size of the scalars in the root cause deviation measures for the likely root causes, as determined at least in part using an aerodynamic model. Each of the likely root causes preferably pertains to a state or condition of an engine component that is likely to have caused a symptom detected in operational data for the engine. Also in a preferred embodiment, these calculations are made by the processor 112 of FIG. 1.

Figure 3:
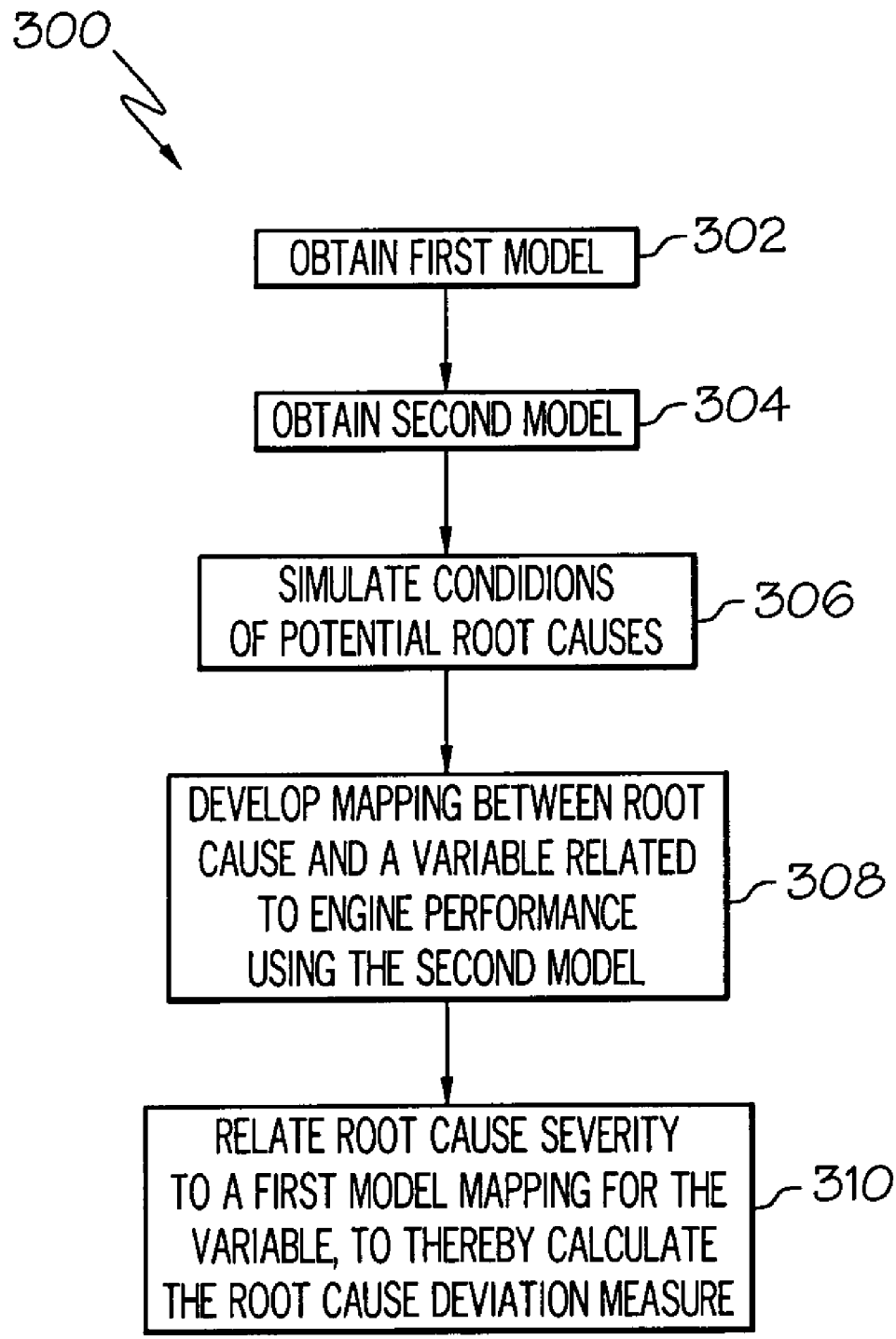
FIG. 3 is a flowchart of a process for a portion of the process of FIG. 2, namely calculating a root cause deviation measure, in accordance with an exemplary embodiment of the present invention.

FIG. 3 is a flowchart of a root cause deviation measure calculation process 300 for calculating a root cause deviation measure for a potential root cause of an engine, in accordance with an exemplary embodiment of the present invention. For example, in a preferred embodiment, the root cause deviation measure calculation process 300 represents a particular implementation of step 214 of the root cause determination process 200 of FIG. 2.

As depicted in FIG. 3, the root cause deviation measure calculation process 300 begins with step 302, in which a first model is obtained. In a preferred embodiment, the first model comprises a thermodynamic model, and will be hereafter referenced as the "thermodynamic model". However, in certain embodiments, other types of models may be used. The thermodynamic model preferably relates one or more engine components to various performance measures of an engine.

In addition, a second model is also obtained (step 304). In a preferred embodiment, the second model comprises an aerodynamic model, and will be hereafter referenced as the "aerodynamic model". However, in certain embodiments, other types of models may be used. The aerodynamic model preferably relates various potential root causes to various performance measures of the engine. In a preferred embodiment, the thermodynamic model and the aerodynamic model are stored in the memory 118 of the computer system 104 of FIG. 1.

Next, in step 306, simulated conditions are generated to be representative of various potential root causes. For example, in an exemplary embodiment, the potential root causes may include tip clearance loss, profile loss, trailing edge loss, and secondary loss pertaining to a turbine, although various other different types of potential root causes may also be used, and with respect to various other different engine components. In this exemplary embodiment, a simulator is used to simulate conditions reflecting various different levels of tip clearance loss, profile loss, trailing edge loss, and secondary loss of the turbine, and resulting effects on various measures of engine performance (such as efficiency change, airflow change, pressure ratio change, and/or various other different measures) based on these conditions, all represented by simulated data obtained from the simulated conditions. In a preferred embodiment, this simulation is performed at least in part by a processor, such as the processor 112 depicted in FIG. 1.

Next, in step 308, a mapping is developed between each root cause and a variable related to engine performance, using the simulated data and an aerodynamic model. For example, in an exemplary embodiment using a potential root cause of tip clearance loss in a turbine, a mapping is preferably created that represents a relationship between different levels of tip clearance loss in the turbine and one or more variables of a thermodynamic model, such as efficiency change, airflow change, pressure ratio change, and/or various other different performance measures of the engine.

The mapping for the root cause is then correlated with levels of severity for the root cause, as reflected in the simulated data, in order to calculate the root cause deviation measures (step 310). In a preferred embodiment, the mapping represents different scalars or other adjustment factors for the thermodynamic model based on multiple different levels of severity for the root cause. The root cause deviation measure is calculated based on the mapping between the root cause and the thermodynamic model. In a preferred embodiment, the root cause deviation measure is calculated by combining various scalars or other adjustment factors of the mapping of the root cause into a table and/or another easily accessible format. The root cause deviation measure can subsequently be used in performing engine diagnostics after operational data is obtained for the engine, for example in the root cause determination process 200 of FIG. 2.

In certain embodiments, the mapping of the root causes to the thermodynamic parameters may then be stored in memory for future use, such as for use in the root cause determination process 200 of FIG. 2. Specifically, in a preferred embodiment, in step 312, the calculated root cause deviations measures are stored in the memory 118 of the computer system 104 of FIG. 1. These values may be subsequently used in connection with the root cause determination process 200 of FIG. 2, for example in the comparisons of step 214.

Figure 4:
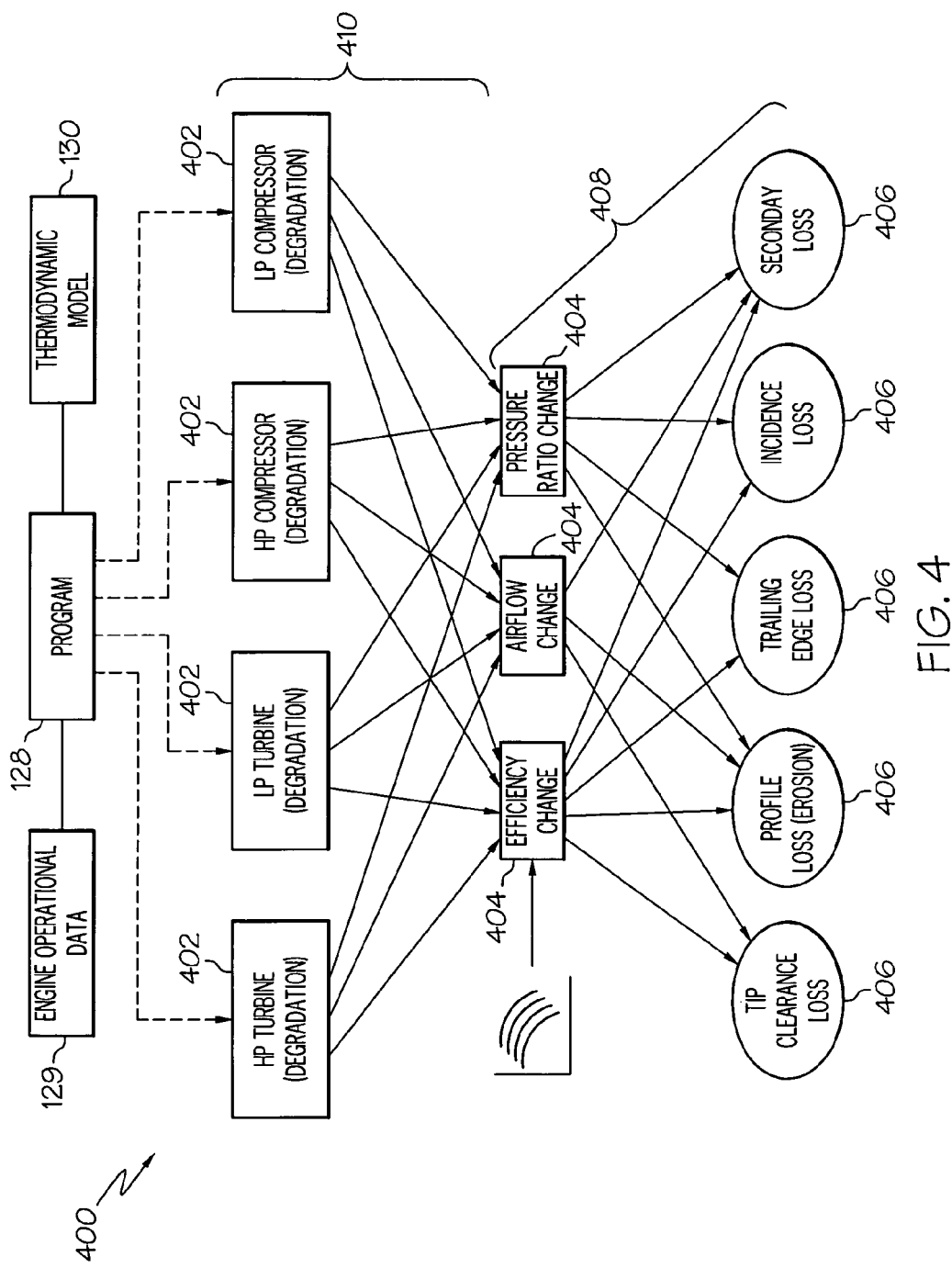
FIG. 4 is a representation of an exemplary implementation of the processes of FIG. 2 and FIG. 3 using the health maintenance system of FIG. 1, in accordance with an exemplary embodiment of the present invention.

FIG. 4 is a representation of an implementation of the root cause determination process 200 of FIG. 2 and the root cause deviation measure calculation process 300 of FIG. 3 using the health maintenance system 100 of FIG. 1, in accordance with an exemplary embodiment of the present invention. As depicted in FIG. 4, in an exemplary embodiment, these processes are carried out by one or more programs 128 residing in the memory 118 of the computer system 104 of FIG. 1, using engine operational data 129 and a thermodynamic model 130 also stored in the memory 118. In the depicted embodiment, the program 128 at least facilitates selection of various engine components 402, such as a high pressure turbine, a low pressure turbine, a high pressure compressor, a low pressure compressor, a fan tip, a fan hub, a combustor, and measures thereof (such as one or more measures of degradation of each such engine component 402) that may potentially be related to the engine operational data 129. Specifically, in a preferred embodiment, the processor 112 of FIG. 1 (not depicted in FIG. 4) also assists in making such selections, and in performing various other steps, through instructions provided at least in part by the program 128.

Also as depicted in FIG. 4, various component deviations 410 represent relationships between the engine components 402 and a thermodynamic model 130, as reflected in various thermodynamic model variables 404, such as efficiency change, airflow change, and pressure ratio change. In addition, various root cause deviation measures 408 represent relationships between various potential root causes 406 (such as tip clearance loss, profile loss, trailing edge loss, incidence loss, and secondary loss of certain engine components 402) and the thermodynamic model variables 404. As discussed above, in one preferred embodiment, the root cause deviation measures 408 are calculated using simulated operational data and using an aerodynamic model. The root cause deviation measures 408 can then be compared with various respective component deviations 410 pertaining to the same engine components 402 in performing diagnostics on the engine, and in particular in determining one or more potential root causes 406 related to one or more symptoms of the engine operational data 129, for example using the processes set forth in FIGS. 2 and 3 and described in detail above.

Figure 5:
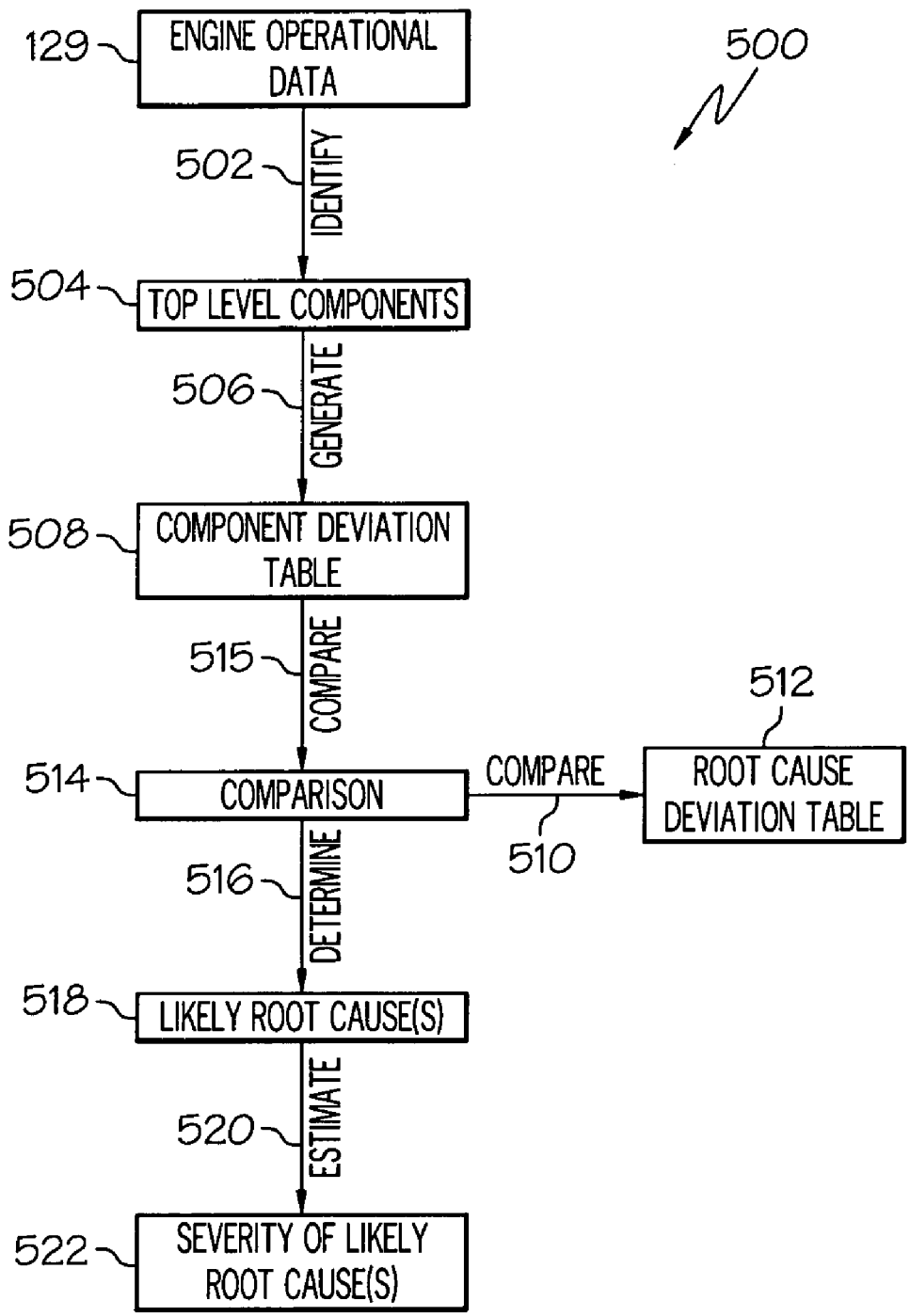
FIG. 5 is a flowchart of an alternative process for determining a likely root cause of a symptom identified from operational data for an engine, and that can be implemented in connection with the health maintenance system of FIG. 1, in accordance with an exemplary embodiment of the present invention.

FIG. 5 is a flowchart of an exemplary embodiment of an alternative process 500 for determining a likely root cause related to one or more symptoms represented in operational data for an engine. For example, the alternative process 500 can be used in connection with a genetic algorithm, and/or any one of a number of other different types of estimation algorithms that can estimate component deviations in a single step. The alternative process 500 can also be implemented in connection with the health maintenance system 100 of FIG. 1, in accordance with an exemplary embodiment of the present invention. As depicted in FIG. 5, the alternative process 500 begins in step 502 with the identification of various top level components 504 of the engine.

In a preferred embodiment, the top level components 504 are identified as being potentially related to a symptom evidenced in the engine operational data 129 represented in FIG. 1. For example, in one illustrative embodiment, such top level components 504 may include a high pressure turbine, a low pressure turbine, a high pressure compressor, a low pressure compressor, a fan tip, a fan hub, a combustor, and/or any one or more of a number of other different types of engine components that may represent a high level cause for a symptom of an engine. In a preferred embodiment, the top level components 504 are identified by the processor 112 of FIG. 1.

Next, in step 506, a top level deviation table 508 is generated, preferably that relates the top level components 504 to an engine symptom from the engine operational data 129 through adjustments to a thermodynamic model with respect to certain variables of the thermodynamic model, based at least in part on the engine operational data 129. For example, FIG. 6 depicts an exemplary top level deviation table 508 in accordance with one embodiment of the present invention. In the depicted embodiment, the top level deviation table 508 includes a plurality of scalars (fourteen are depicted in FIG. 6). In a preferred embodiment, each scalar represents a relationship of a particular top level component 504 on a thermodynamic model with respect to a particular variable 602 of the thermodynamic model.

Specifically, in the depicted embodiment, the top level deviation table 508 includes a top level efficiency scalar 604 and a top level airflow scalar 606 for each of the various top level components 504. Each top level efficiency scalar 604 represents an effect of a particular top level component 504 on engine efficiency in the thermodynamic model (for example, a shift or other adjustment in values of engine efficiency in the thermodynamic model believed to be caused by the particular top level component 504). Likewise, each top level airflow scalar 606 represents an effect of a particular top level component 504 on engine airflow in the thermodynamic model (for example, a shift or other adjustment in values of engine airflow in the thermodynamic model believed to be caused by the particular top level component 504). It will be appreciated that various other top level components 504 and/or various other thermodynamic model variables may also be used, which would result in various different types of scalars in the top level deviation table 508. In a preferred embodiment, the top level deviation table 508 is generated by the processor 112 of FIG. 1.

Next, in step 510, the top level deviation table 508 is compared with a root cause deviation table 512. The root cause deviation table 512 preferably relates different potential root causes of potential symptoms through adjustments to a thermodynamic model with respect to certain variables of the thermodynamic model, based at least in part on simulated operational data. Preferably each root cause includes a measure reflecting a condition or state of a particular top level component 504 of the engine. For example, FIG. 7 depicts an exemplary root cause deviation table 512 in accordance with one exemplary embodiment of the present invention. In the depicted embodiment, the root cause deviation table 512 includes a plurality of scalars (twenty eight are depicted in FIG. 7). Each scalar represents a relationship of a particular root cause 702 on a thermodynamic model with respect to a particular variable 602 of the thermodynamic model.

Specifically, in the depicted embodiment, the root cause deviation table 512 includes a root cause efficiency scalar 704 and a root cause airflow scalar 706 for each root cause 702 of each top level component 504. Each root cause efficiency scalar 704 represents an effect of a particular root cause 702 on engine efficiency in the thermodynamic model (for example, a shift or other adjustment in values of engine efficiency in the thermodynamic model believed to be caused by the particular root cause 702). Likewise, each root cause airflow scalar 706 represents an effect of a particular root cause 702 on engine airflow in the thermodynamic model (for example, a shift or other adjustment in values of engine airflow in the thermodynamic model believed to be caused by the particular root cause 702).

In the depicted embodiment, each top level component 504 includes two root causes. Specifically, the high pressure turbine, the high pressure compressor, the low pressure turbine, the low pressure compressor, the fan tip, and the fan hub top level components 504 each have a first root cause 702 for tip clearance, and a second root cause 702 for profile loss. The combustor top level component 504 has a first root cause 702 for whether and/or to what extent there is a clogged nozzle, and a second root cause for whether and/or to what extent there is a swirler malfunction. It will be appreciated that various other root causes 702, top level components 504, and/or thermodynamic model variables may also be used, which would result in various different types of scalars in the root cause deviation table 512. In a preferred embodiment, the root cause deviation table 512 is generated by the processor 112 of FIG. 1.

In a preferred embodiment, the comparison 514 includes taking the top level efficiency scalar 604 and the top level airflow scalar 606 of a particular top level component 504, and comparing these scalars with corresponding root cause efficiency scalars 704 and root cause airflow scalars 706 for that particular top level component 504, based on the root causes 702 for that top level component 504. For example, if it is suspected that a high pressure turbine may be a top level cause of a particular symptom, then, in a preferred embodiment, the root cause efficiency and airflow scalars 704, 706 of the tip clearance root cause 702 of the high pressure turbine top level component 504 are taken from FIG. 7, and are compared with the top level efficiency and airflow scalars 604, 606 of the high pressure turbine top level component 504 from FIG. 6, for example with respect to the signs and/or magnitudes of the respective scalars. In addition, in this example, the root cause efficiency and airflow scalars 704, 706 of the profile loss root cause 702 of the high pressure turbine top level component 504 are also taken from FIG. 7, and are compared with the top level efficiency and airflow scalars 604, 606 of the high pressure turbine top level component 504 from FIG. 6, also for example with respect to the signs and/or magnitudes of the respective scalars.

In this example, this comparison provides an indication as to whether tip clearance and/or profile loss in the high pressure turbine are likely root causes of an engine symptom identified in the engine operational data 129. In addition, similar comparisons are preferably conducted for the root causes 702 of the various other top level components 504. Based on these comparisons, one or more likely root causes 518 of one or more symptoms represented in engine operational data are determined in step 516, based on a proximity between the scalars of the root causes 702 to the scalars of the top level component 504 related thereto. Then, in step 520, a severity 522 is estimated for each of the one or more likely root causes 518, based on the magnitudes of the scalars of the likely root causes 518.

The processes, programs, and systems depicted in the Figures and described above are exemplary in nature, and may vary. These processes, programs, and systems, and/or the components thereof, may vary, and/or may be used together in connection with one another. Moreover, these processes, programs, and systems may be implemented or used in connection with any one or more of a number of different types of engines, vehicles, and/or various other devices, systems, processes, and/or environments. The depicted processes, programs, and systems depicted and described herein can be of significant potential benefit, for example in increasing efficiency and reducing time and costs associated with engine diagnosis, for example after such engines require testing following manufacture, repair, and/or overhaul.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for performing diagnostics for an engine using operational data for the engine, the operational data pertaining to a plurality of performance measures of the engine, the method comprising the steps of:
   determining a symptom of the engine from the operational data, the symptom pertaining to a measure of health of the engine that is unexpected, undesirable, or both;
   identifying an engine component as potentially being related to the symptom using the operational data;
   calculating a component deviation from a first model, wherein the component deviation relates the engine component to an adjustment to the first model with respect to a variable of the first model, the adjustment believed to be potentially caused by the engine component, based at least in part on the operational data;
   determining a plurality of root cause deviation measures offline via a second model using simulated operational data representing various different possible conditions for the engine;
   comparing the component deviation with the plurality of root cause deviation measures, each root cause deviation measure relating one of a plurality of potential root causes for the symptom to the first model with respect to the variable of the first model, thereby generating a plurality of comparisons; and
   selecting one of the plurality of potential root causes as a likely root cause of the symptom based on the plurality of comparisons.

2. The method of claim 1, wherein:
   the first model comprises a thermodynamic model; and
   the second model comprises an aerodynamic model.

3. The method of claim 2, wherein the component deviation and the plurality of root cause deviation measures comprise scalars, each scalar comprising a multiplicative or additive deviation to the thermodynamic model.

4. The method of claim 2, further comprising the steps of:
   calculating a second component deviation from the thermodynamic model, wherein the second component deviation relates the engine component to a second adjustment to the thermodynamic model with respect to a second variable of the thermodynamic model, based at least in part on the operational data; and
   comparing the second component deviation with a plurality of root cause second deviation measures, each root cause second deviation measure relating one of the plurality of potential root causes to the thermodynamic model with respect to the second variable of the thermodynamic model.

5. The method of claim 4, selecting one of the plurality of potential root causes comprises the step of selecting one of the plurality of potential root causes as the likely root cause of the symptom, based at least in part on a similarity of a root cause deviation measure and a root cause second deviation measure of the likely root cause to the component deviation and the second component deviation, respectively.

6. The method of claim 4, wherein the variable or the second variable, or both, of the thermodynamic model comprise a measure of efficiency, airflow, or pressure ratio relating to the engine component.

7. The method of claim 4, further comprising the steps of:
   identifying an additional engine component as potentially being related to the operational data;
   calculating an additional component deviation from the thermodynamic model, wherein the additional component deviation relates the additional engine component to an additional adjustment to the thermodynamic model with respect to the variable or the second variable, or both, of the thermodynamic model, based at least in part on the operational data; and
   comparing the additional component deviation with a plurality of additional root cause deviation measures, each additional root cause deviation measure relating one of a plurality of additional potential root causes to the thermodynamic model with respect to the variable or the second variable, or both, of the thermodynamic model.

8. A method for generating a root cause deviation for a component of an engine for use in performing diagnostics for the engine, the method comprising the steps of:
   identifying a plurality of root causes of a symptom of the engine, the symptom pertaining to a measure of health of the engine that is unexpected, undesirable, or both, each root cause comprising a condition of the component;
   simulating conditions of the component for each of the plurality of root causes, to thereby generate simulated data;
   developing a mapping between each potential root cause and a first variable related to engine performance, using the simulated data and a first model;
   determining values of a second variable via a second model using simulated operational data representing various different possible conditions for the engine; and
   relating the mapping to the second variable, to thereby determine a root cause deviation measure for the component.

9. The method of claim 8, wherein:
   the first model comprises an aerodynamic model; and
   the second model comprises a thermodynamic model.

10. The method of claim 9, further comprising the steps of:
selecting an additional component of the engine;
identifying a plurality of additional root causes of the symptom, each additional root cause comprising a condition of the additional component;
simulating conditions of the additional component for each of the plurality of additional root causes, to thereby generate additional simulated data;
developing an additional mapping between each potential additional root cause and a first additional variable related to engine performance, using the additional simulated data and the aerodynamic model; and
relating the additional mapping to a second additional variable of the thermodynamic model, to thereby determine an additional root cause deviation measure for the additional component.

11. The method of claim 10, wherein the root cause deviation measure and the additional root cause deviation measure comprise scalars, each scalar comprising a multiplicative or additive deviation to the thermodynamic model.

12. A program product for performing diagnostics for an engine using operational data for the engine, the operational data pertaining to a plurality of performance measures of the engine, the program product comprising:
(a) a program configured to at least facilitate:
determining a symptom of the engine from the operational data, the symptom pertaining to a measure of health of the engine that is unexpected, undesirable, or both;
identifying an engine component as potentially being related to the symptom using the operational data;
calculating a component deviation from a thermodynamic model, wherein the component deviation relates the engine component to an adjustment to the thermodynamic model with respect to a variable of the thermodynamic model, the adjustment believed to be potentially caused by the engine component, based at least in part on the operational data;
determining a plurality of root cause deviation measures offline via an aerodynamic model using simulated operational data representing various different possible conditions for the engine;
comparing the component deviation with the plurality of root cause deviation measures, each root cause deviation measure relating one of a plurality of potential root causes for the symptom to the thermodynamic model with respect to the variable of the thermodynamic model, thereby generating a plurality of comparisons; and
selecting one of the plurality of potential root causes as a likely root cause of the symptom based on the plurality of comparisons; and
(b) a non-transitory computer readable storage medium bearing the program and containing computer instructions for causing a computer processor to perform the program.

13. The program product of claim 12, wherein the program is further configured to at least facilitate:
calculating a second component deviation from the thermodynamic model, wherein the second component deviation relates the engine component to a second adjustment to the thermodynamic model with respect to a second variable of the thermodynamic model, based at least in part on the operational data; and
comparing the second component deviation with a plurality of root cause second deviation measures, each root cause second deviation measure relating one of the plurality of potential root causes to the thermodynamic model with respect to the second variable of the thermodynamic model.

14. The program product of claim 13, wherein the program is further configured to at least facilitate selecting one of the plurality of potential root causes as a likely root cause, based at least in part on a similarity of a root cause deviation measure and a root cause second deviation measure of the likely root cause to the component deviation and the second component deviation, respectively.

15. The program product of claim 13, wherein the program is further configured to at least facilitate:
identifying an additional engine component as potentially being related to the operational data;
calculating an additional component deviation from the thermodynamic model, wherein the additional component deviation relates the additional engine component to an additional adjustment to the thermodynamic model with respect to the variable, the second variable, or both, of the thermodynamic model, based at least in part on the operational data;
comparing the additional component deviation with a plurality of additional root cause deviation measures, each additional root cause deviation measure relating one of a plurality of additional potential root causes to the thermodynamic model with respect to the variable or the second variable, or both, of the thermodynamic model.

16. A program product for generating a root cause deviation for a component of an engine for use in performing diagnostics for the engine, the program product comprising:
(a) a program configured to at least facilitate:
identifying a plurality of root causes of a symptom of the engine, the symptom pertaining to a measure of health of the engine that is unexpected, undesirable, or both, each root cause comprising a condition of the component;
simulating conditions of the component for each of the plurality of root cases, to thereby generate simulated data;
developing a mapping between each potential root cause and a first variable related to engine performance, using the simulated data and an aerodynamic model;
determining values pertaining to a second variable of a thermodynamic model using simulated operational data representing various different possible conditions for the engine via an aerodynamic model; and
relating the mapping to second variable, to thereby determine a root cause deviation measure for the component; and
(b) a non-transitory computer readable storage medium bearing the program and containing computer instructions for causing a computer processor to perform the program.

17. The program product of claim 16, wherein the program is further configured to at least facilitate:
selecting an additional component of the engine;
identifying a plurality of additional root causes of the symptom, each additional root cause comprising a condition of the additional component;
simulating conditions of the additional component for each of the plurality of additional root causes, to thereby generate additional simulated data;
developing an additional mapping between each potential additional root cause and a first additional variable related to engine performance, using the additional simulated data and the aerodynamic model; and relating the additional mapping to a second additional variable of the thermodynamic model, to thereby determine an additional root cause deviation measure for the additional component;

wherein the root cause deviation measure and the additional root cause deviation measure comprise scalars, each scalar comprising a multiplicative or additive deviation to the thermodynamic model.

18. A health maintenance system for an engine, the health maintenance system comprising:
   a sensing device configured to sense operational data for the engine, the operational data pertaining to a plurality of performance measures of the engine; and
   a processor configured to at least facilitate:
      determining a symptom of the engine from the operational data, the symptom pertaining to a measure of health of the engine that is unexpected, undesirable, or both;
      identifying an engine component as potentially being related to the symptom using the operational data;
      calculating a component deviation from a thermodynamic model, wherein the component deviation relates the engine component to an adjustment to the thermodynamic model with respect to a variable of the thermodynamic model, the adjustment believed to be potentially caused by the engine component, based at least in part on the operational data;
      determining a plurality of root cause deviation measures offline via an aerodynamic model using simulated operational data representing various different possible conditions for the engine;
      comparing the component deviation with the plurality of root cause deviation measures, each root cause deviation measure relating one of the plurality of potential root causes for the symptom to the thermodynamic model with respect to the variable of the thermodynamic model, thereby generating a plurality of comparisons; and
      selecting one of the plurality of potential root causes as a likely root cause of the symptom based on the plurality of comparisons.

19. The health maintenance system of claim 18, further comprising:
   a memory configured to store the plurality of root cause deviation measures.

20. The health maintenance system of claim 18, wherein the processor is further configured to at least facilitate:
   calculating a second component deviation from the thermodynamic model, wherein the second component deviation relates the engine component to a second adjustment to the thermodynamic model with respect to a second variable of the thermodynamic model, based at least in part on the operational data; and
   comparing the second component deviation with a plurality of root cause second deviation measures, each root cause second deviation measure relating one of the plurality of potential root causes to the thermodynamic model with respect to the second variable of the thermodynamic model.

21. The health maintenance system of claim 20, wherein the processor is further configured to at least facilitate selecting one of the plurality of potential root causes as a likely root cause, based at least in part on a similarity of a root cause deviation measure and a root cause second deviation measure of the likely root cause to the component deviation and the second component deviation, respectively.

22. The health maintenance system of claim 21, wherein the processor is further configured to at least facilitate quantifying an estimated severity of the likely root cause, based at least in part on a magnitude of the root cause deviation measure or the root cause second deviation measure, or both, of the likely root cause.

* * * * *